US010317641B2

(12) United States Patent
Santos et al.

(10) Patent No.: US 10,317,641 B2
(45) Date of Patent: Jun. 11, 2019

(54) MULTI-HOLE CENTER-FED FIBER OPTIC STRIPPING APPARATUS (71) Applicant: Ripley Tools, LLC, Cromwell, CT (US)

(72) Inventors: Manuel A. Santos, Meriden, CT (US); Tadeusz Zagula, Newington, CT (US)

(73) Assignee: RIPLEY TOOLS, LLC, Cleveland, OH (US)

( * ) Notice: Subject to any disclaimer, the term of this patent is extended or adjusted under 35 U.S.C. 154(b) by 96 days.

(21) Appl. No.: 14/893,975

(22) PCT Filed: Aug. 26, 2014

(86) PCT No.: PCT/US2014/052671
§ 371 (c)(1),
(2) Date: Nov. 25, 2015

(87) PCT Pub. No.: WO2015/031338
PCT Pub. Date: Mar. 5, 2015

(65) Prior Publication Data
US 2016/0103291 A1    Apr. 14, 2016

Related U.S. Application Data (60) Provisional application No. 61/869,923, filed on Aug. 26, 2013.

(51) Int. Cl.
G02B 6/44       (2006.01)
H02G 1/12       (2006.01)
G02B 6/245      (2006.01)

(52) U.S. Cl.
CPC ........ *G02B 6/4497* (2013.01); *G02B 6/245* (2013.01); *H02G 1/1209* (2013.01); *H02G 1/1224* (2013.01)

(58) Field of Classification Search
CPC ........ G02B 6/4497; G02B 6/245; G02B 6/24; G02B 6/25; G02B 6/46; H02G 1/1209;
(Continued)

(56) References Cited

U.S. PATENT DOCUMENTS 2,385,368 A * 9/1945 Montgomery ........... H01B 7/36
                                                     30/90.7
3,146,645 A * 9/1964 Hindenburg ......... H02G 1/1212
                                                     81/9.43
(Continued)

FOREIGN PATENT DOCUMENTS

CA        2353371 A1 * 7/2002  ............. G02B 6/245

*Primary Examiner* — Jonathan G Riley
(74) *Attorney, Agent, or Firm* — DeLio, Peterson & Curcio, LLC; Thomas E. Ciesco (57) ABSTRACT A fiber optic stripping apparatus comprising a frame having an axis and a pair of outer arms extending from the axis, each arm pivotal about the axis and a pair of first blades each first blade having a first blade edge, each of the first blades attached to a corresponding frame arm with the first blade edge extending in the direction of the corresponding frame arm. The stripping apparatus includes a pair of second blades each second blade having a second blade edge, each of the second blades attached to a corresponding frame arm with the second blade edge extending transverse to the direction of the corresponding frame arm, the second blades each having a first set of notches forming a circle when the stripping apparatus is in a closed position and a second set of notches substantially forming a circle when the stripping apparatus is in the closed position.

7 Claims, 9 Drawing Sheets (58) Field of Classification Search
CPC .. H02G 1/1204; H02G 1/1229; H02G 1/1207; H02G 1/1236; H02G 1/1212; H02G 1/1241; H02G 1/1224; H02G 1/1221; Y10T 29/49821; Y10T 156/1168; Y10T 156/1184; Y10T 156/1972; Y10T 29/5151; B26D 3/166; B26D 3/169
See application file for complete search history.

(56) References Cited

U.S. PATENT DOCUMENTS

| | | | | |
|---|---|---|---|---|
| 3,422,708 A * | 1/1969 | Bieganski | H02G 1/1212 | 81/367 |
| 3,696,509 A * | 10/1972 | Lancaster | H02G 1/1229 | 30/90.6 |
| 3,915,037 A * | 10/1975 | Wiener | H02G 1/1212 | 81/9.43 |
| 4,083,105 A * | 4/1978 | ViPond | H02G 1/1229 | 30/90.4 |
| 4,112,791 A * | 9/1978 | Wiener | H02G 1/1212 | 30/90.1 |
| 5,062,192 A * | 11/1991 | Sawyer | H02G 1/1229 | 29/426.4 |
| 5,150,522 A * | 9/1992 | Gwo-Jiang | H02G 1/1224 | 30/91.2 |
| 5,245,894 A * | 9/1993 | Undin | H02G 1/1212 | 81/9.41 |
| 5,295,421 A | 3/1994 | Mansfield et al. | | |
| 6,089,125 A * | 7/2000 | Cheng | H02G 1/1212 | 81/9.44 |
| 6,439,084 B1 * | 8/2002 | Ebert | H02G 1/1212 | 30/90.1 |
| 6,473,925 B1 | 11/2002 | Konen | | |
| 6,526,661 B1 | 3/2003 | Shutts et al. | | |
| 6,910,401 B2 * | 6/2005 | Tapper | H02G 1/1212 | 30/90.1 |
| 2005/0028373 A1 * | 2/2005 | Murphy | H02G 1/1236 | 30/90.1 |
| 2009/0126534 A1 * | 5/2009 | Storm | H02G 1/1212 | 81/9.43 |

\* cited by examiner

MULTI-HOLE CENTER-FED FIBER OPTIC STRIPPING APPARATUS

BACKGROUND OF THE INVENTION

1. Field of the Invention

The present invention is directed to a tool for stripping the outer jacket, buffer tube and UV-cured buffer off a fiber optic cable.

2. Description of Related Art

One type of fiber optic cable includes a center fiber optic cladding surrounded by a UV cured buffer coating. The buffer coating is surrounded by a buffer tube which is surrounded by an outer jacket. In order to access the fiber optic cladding, each layer must be carefully removed in order to prevent damage to any of the layers below. Each layer typically requires the use of a specialized tool. A technician accessing the fiber optic core or the fiber optic stands in the center of the cable carries at least several of these specialized tools, removing one layer, placing the used tool in his bag or belt, retrieving another tool for removing the next layer, and repeating this for each layer which may be removed. There is a need for a tool which saves the technician time in performing these tasks.

SUMMARY OF THE INVENTION

Bearing in mind the problems and deficiencies of the prior art, it is therefore an object of the present invention to provide a tool which performs multiple functions in working with fiber optic cables.

It is another object of the present invention to provide a tool which is capable of stripping multiple layers from a fiber optic cable.

A further object of the invention is to provide a fiber optic cable stripping tool which precisely secures a cable for ensuring sequential stripping of layers without damage to other layers below.

It is yet another object of the present invention to provide a tool which strips the outer jacket from a fiber optic cable and removes the outer and inner buffer layers of the fiber optic cable.

Still other objects and advantages of the invention will in part be obvious and will in part be apparent from the specification.

The above and other objects, which will be apparent to those skilled in the art, are achieved in the present invention which is directed to a fiber optic stripping apparatus comprising a frame having an axis and a pair of outer arms extending from the axis, each arm pivotal about the axis and a pair of first blades each first blade having a first blade edge, each of the first blades attached to a corresponding frame arm with the first blade edge extending in the direction of the corresponding frame arm. The fiber optic stripping apparatus includes a pair of second blades each second blade having a second blade edge, each of the second blades attached to a corresponding frame arm with the second blade edge extending transverse to the direction of the corresponding frame arm, the second blades each having a first set of notches, the first notches substantially forming a circle when the stripping apparatus is in a closed position, and a second set of notches, the second notches being smaller than the first notch, the second notches substantially forming a circle when the stripping apparatus is in a closed position. The fiber optic stripping apparatus includes a first and second inner guide disposed on one side of the each of the second blades and a first and second outer guide disposed on the other side of each of the second blades, the inner and outer guides each having one of an inner or outer groove sets, the inner and outer of one set aligned with the first set of notches and the inner and outer of the other set aligned with the second set of notches such that when a fiber optic cable is placed within the first groove set, an outer buffer tube on the fiber optic cable may be scored by the first notches and when the fiber optic cable is placed within the second groove set, an inner buffer tube may be scored by the second notches.

The fiber optic stripping apparatus may include a measurement scale disposed on at least one of the arms for measuring the length of the cable to be stripped. The fiber optic stripping apparatus may include a stop disposed adjacent the pivot of the inner arms for limiting the distance the arms extend away from one another. The first inner guide and second inner guide may slidingly engage one another so the notches form various sized holes. The fiber optic stripping apparatus may include a cleaning brush removably attached to one of the outer arms. The fiber optic stripping apparatus may include a pair of blade holders for securing the second blades to the outer arms.

Another aspect the present invention is directed to a fiber optic stripping apparatus comprising a frame having a fulcrum and a pair of outer arms extending from the fulcrum, each arm pivotal about the fulcrum, a pair of guide aims each attached at one end to a common pivot pin and at the other end to one of the outer arm ends away from the fulcrum and a pair of first blades each first blade having a first blade edge, each of the first blades attached to a corresponding guide arm with the first blade edge extending in the direction of the corresponding frame arm. The stripping apparatus includes an upper and lower blade each having a second blade edge, each of the upper and lower blades attached to a corresponding guide arm with the upper and lower blade edges extending transverse to the direction of the corresponding frame arm, the upper and lower blades each having a first notch, the first notches forming a circle when the stripping apparatus is in a closed position. The stripping apparatus includes a first and second lower guide disposed on opposite sides of the lower blade, each of the first and second lower guides having a lower groove, the lower grooves aligned with the lower first notch and a first and second upper guide disposed on opposite sides of the upper blade, each of the first and second upper guides having an upper groove, the upper grooves aligned with the upper first notch. When a fiber optic cable is placed axially along the lower grooves and the stripping apparatus is moved to the closed position, an outer buffer tube on the fiber optic cable may be scored by the first notches.

The upper and lower blades each may include a second notch, the second notches forming a circle when the stripping apparatus is in a closed position and wherein each of the first and second lower guides includes a second lower groove, the second lower grooves aligned with the lower second notch and each of the first and second upper guides includes a second upper groove, the second upper grooves aligned with the upper second notch, whereby when a fiber optic cable is placed axially along the second lower grooves and the stripping apparatus is moved to the closed position, an inner buffer tube on the fiber optic cable may be scored by the second notches. The fiber optic stripping apparatus may include a stop disposed adjacent the pivot of the inner arms for limiting the distance the arms extend away from one another. The fiber optic stripping apparatus may include a cleaning brush removably attached to one of the outer arms. The guide arms may terminate at the common pivot pin and are at an acute angle to one another when the stripping apparatus is in the open position and may be substantially parallel when the stripping apparatus is in the closed position. The first inner guide and second inner guide may slidingly engage one another so the notches form various sized holes. The fiber optic stripping apparatus may include a measurement scale disposed on at least one of the arms for measuring the length of the cable to be stripped.

Another aspect the present invention is directed to a method for using a fiber optic stripping apparatus comprising providing a fiber optic stripping apparatus including a frame having a fulcrum and a pair of outer arms extending from the fulcrum, each arm pivotal about the fulcrum, a pair of guide arms each attached at one end to a common pivot pin and at the other end to one of outer arm ends away from the fulcrum and a pair of first blades each first blade having a first blade edge, each of the first blades attached to a corresponding guide arm with the first blade edge extending in the direction of the corresponding frame arm and an upper and lower blade each having a second blade edge, each of the upper and lower blades attached to a corresponding guide arm with the upper and lower blade edges extending transverse to the direction of the corresponding frame arm, the upper and lower blades each having a first notch, the first notches forming a circle when the stripping apparatus is in a closed position. The stripping apparatus includes a first and second lower guide disposed on opposite sides of the lower blade, each of the first and second lower guides having a lower groove, the lower grooves aligned with the lower first notch and a first and second upper guide disposed on opposite sides of the upper blade, each of the first and second upper guides having an upper groove, the upper grooves aligned with the upper first notch, whereby when a fiber optic cable is placed axially along the lower grooves and the stripping apparatus is moved to the closed position, an outer buffer tube on the fiber optic cable may be scored by the first notches. The method includes providing a fiber optic cable having a central optical fiber, an inner buffer tube, an outer buffer tube and an outer jacket. The method includes ensuring the fiber optic stripping apparatus is in an open position, inserting the fiber optic cable between the first blades, urging the outer arms toward one another until the stripping apparatus is in the closed position and pulling the fiber optic cable axially until a portion of the outer jacket is removed from the fiber optic cable. The method includes releasing the outer arms until the fiber optic stripping apparatus is in the open position, inserting the fiber optic cable between the first notches in the upper and lower guides, urging the outer arms toward one another until the stripping apparatus is in the closed position and pulling the fiber optic cable axially until a portion of the first buffer tube is removed from the fiber optic cable.

The upper and lower blades may each include a second notch, the second notches forming a circle when the stripping apparatus is in a closed position and wherein each of the first and second lower guides includes a second lower groove, the second lower grooves aligned with the lower second notch and each of the first and second upper guides includes a second upper groove, the second upper grooves aligned with the upper second notch, whereby when a fiber optic cable is placed axially along the second lower grooves and the stripping apparatus is moved to the closed position, an inner buffer tube on the fiber optic cable may be scored by the second notches and releasing the outer arms until the fiber optic stripping apparatus is in the open position and wherein the method includes inserting the fiber optic cable between the second notches in the upper and lower guides, urging the outer arms toward one another until the stripping apparatus is in the closed position and pulling the fiber optic cable axially until a portion of the second buffer tube is removed from the fiber optic cable. The method may include a stop disposed adjacent the pivot of the inner arms for limiting the distance the arms extend away from one another. The method may include a cleaning brush removably attached to one of the outer arms for cleaning the stripping apparatus. The guide arms may terminate at the common pivot pin and are at an acute angle to one another when the stripping apparatus is in the open position and are substantially parallel when the stripping apparatus is in the closed position. The first inner guide and second inner guide may slidingly engage one another so the notches form various sized holes. The method may include a measurement scale disposed on at least one of the arms for measuring the length of the cable to be stripped.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-18 of the drawings in which like numerals refer to like features of the invention.

Figure 1:
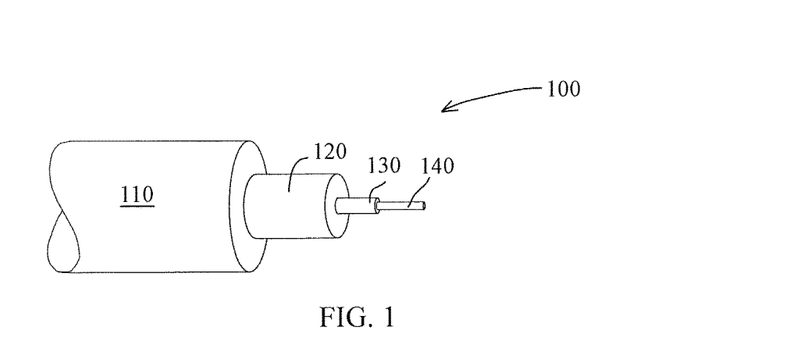
FIG. 1 is a side view of a fiber optic cable having a portion of each layer removed.
Figures 2, 3:
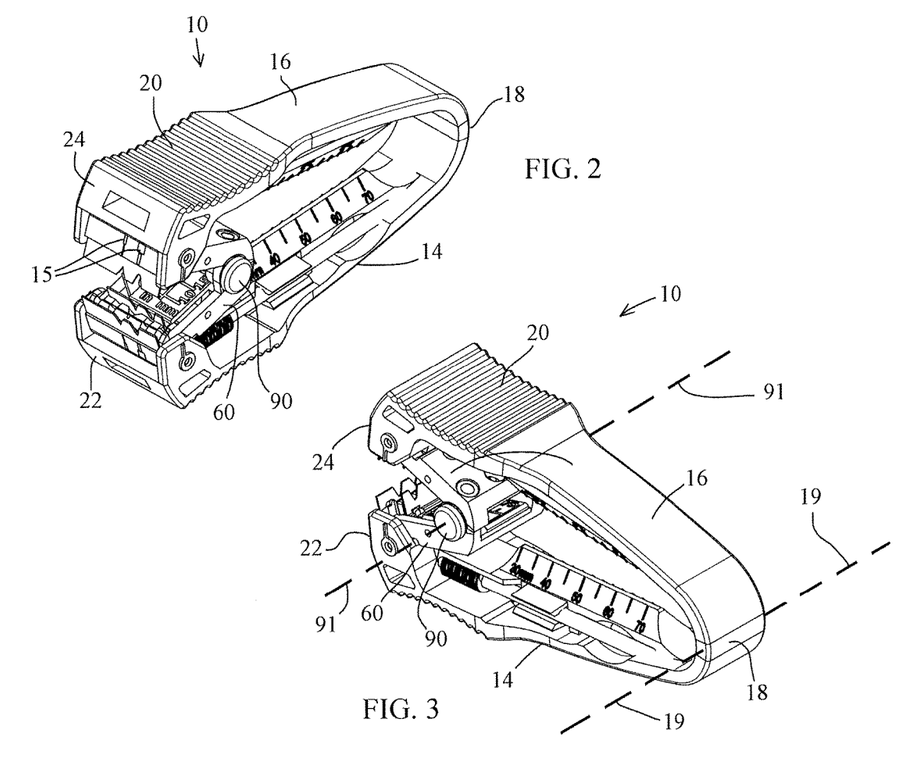
FIG. 2 is a front right top perspective view of the fiber optic stripping tool in the open position according to the present invention.
FIG. 3 is a rear right top perspective view of the fiber optic stripping tool shown in FIG. 2.
Figure 4:
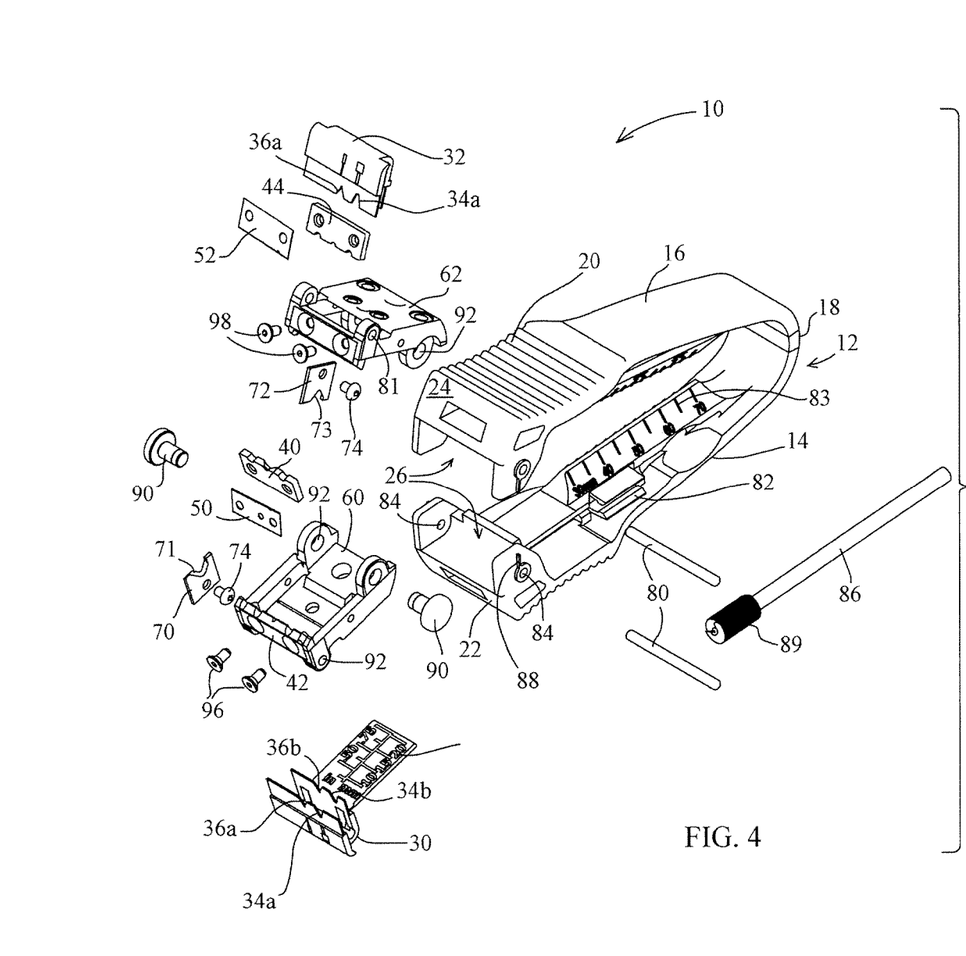
FIG. 4 is an exploded perspective view of the fiber optic stripping tool shown in FIG. 2.
Figure 5:
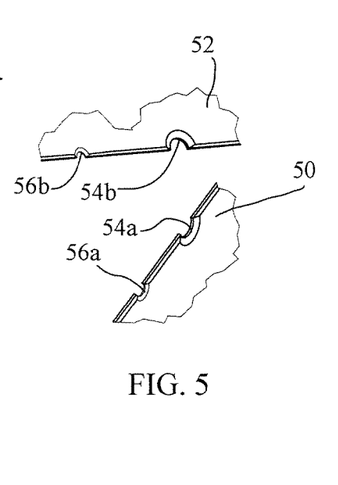
FIG. 5 is an enlarged perspective view of a portion of the front stripping blades according to the present invention.

FIG. 1 is a side perspective view of a section of fiber optic cable 100 having an outer jacket 110, outer buffer tube 120 and an inner buffer tube 130 which may be UV-cured. A center cladding 140 extends through the central axis of the fiber optic cable 100. FIGS. 2 and 3 show perspective views of the fiber optic stripping tool. FIG. 4 shows an exploded view of the fiber optic stripping tool and FIG. 5 shows an enlarged view of the stripping blade grooves. FIGS. 6-9 show side, front and rear elevational views of the stripping tool 110 in the open position. The stripping tool 10 includes a frame 12 having opposing outer arms 14, 16 and a fulcrum 18 which may be a living hinge or flexible member which allows the outer arms 14, 16 to pivot about the axis 19 of fulcrum 18. The frame 12 includes cavities 26 at the distal end 22, 24 of each of the outer arms 14, 16, the open ends of the cavities 26 facing one another. Each cavity 26 includes a pair of cavity openings 84 for engaging a roll pin 80, the roll pin 80 extending through the cavity 26. The stripping tool 10 may have pointers 88 disposed adjacent the cavity openings 84 for showing the location or direction of the second blades.

The stripping tool 10 includes a pair of opposing guide arms 60, 62 including guide arm openings 92 for engaging hinge bolts 90 on one end of the guide arm 60, 62. Hinge bolts 90 rotate about axis 91, which is parallel to living hinge axis 19 in FIG. 3. The opposite end of the guide arm 60, 62 includes roll pin openings 81 for engaging the roll pin 80, which is parallel to hinge 91 and which secures a portion of the guide arms 60, 62 within the cavity 26. Each guide arm 60, 62 includes a pair of pivot openings 92 at the opposite end of the roll pin openings 81. Pivot pins 90 fasten the pivot openings 92 of guide arm 60 to the pivot openings 92 of guide arm 62. When distal ends 22, 24 of the outer arms are moved toward one another, the ends of the guide arms 60, 62 having the roll pin openings 81 also move toward one another. Guide attachments 30, 32 extend through corresponding guide arm openings 48, and include a portion which is secured in the cavity 26 by roll pin 80, and a second portion which extends in a direction toward the opposing guide attachment 30, 32. Guide arms 60, 62 are at an acute angle to one another when the stripping tool 10 is in the open position and are substantially parallel to one another when the stripping tool 10 is in the closed position. A measurement plate 35 may extend from at least one of the guide attachments 30, 32 and visible from a side of the tool for measuring the length of a cable secured between the guide attachments 30, 32 when the stripping tool is in a closed position. The guide arms 60, 62 may include stops for limiting the angle of the guide attachments 60, 62 in relation to one another, thereby limiting the distance between blades in the open position.

The stripping tool 10 includes a pair of opposing stripping blades 50, 52, one stripping blade 50 secured between blade holder halves 40, 42 with fasteners 96 and the other stripping blade 52 secured between blade holder halves 44, 46 with fasteners 98. Both stripping blades 50, 52 are oriented parallel to hinge axes 19, 91 and transverse to the direction of frame arms 14, 16. The stripping blades 50, 52 each have a large semi-circular groove 54a, 54b and a small semi-circular groove 56a, 56b, shown in an enlarged view of a portion of the blades 50, 52 in FIG. 4 of the drawings. The stripping blades 50, 52 extend toward one another so the grooves 54a and 54b form a circular aperture when the stripping tool 10 is in the closed position and the grooves 56a and 56b form a circular aperture when the stripping tool 10 is in the closed position. The circular apertures formed by grooves 56a and 56b, and 54a and 54b are preferably substantially perfect circles since the layers are very susceptible to damage during stripping. Opposing guide attachments 30, 32 include first notches 34a, 34b which engage the cable outer buffer tube when the stripping tool 10 is in the closed position. Opposing guide attachments 30, 32 include a second notch 36a, 36b which engage the cable inner buffer tube when the stripping tool 10 is in the closed position. When the stripping tool 10 is in the open position, the stripping blades 50, 52 are preferably substantially perpendicular to one another. The guide attachments 30, 32 may slidingly overlap one another when the stripping tool 10 is in the closed position.

The stripping tool 10 includes a pair of jacket blades 70, 72, one jacket blade 70 attached to the guide arm 60 with a fastener 74 and the other jacket blade 72 is attached to the guide arm 62 with fastener 74. The jacket blades 70, 72 extend in the direction of frame arms 14, 16 and are secured perpendicular to the hinge axes 19, 91 and to the stripping blades 50, 52 when the stripping tool 10 is in the closed position. The jacket blades 70, 72 include jacket blade notches 71, 73, respectively. The jacket blade notches 71, 73 have sharp edges capable of cutting through the outer jacket of the fiber optic cable and removing a portion of the outer jacket when the stripping tool 10 is in the closed position.

The stripping tool 10 may include a cleaning brush 86 having bristles 89 for cleaning debris off the stripping area of the stripping tool 10. The frame 16 may include at least one securing clip 82 for securing the cleaning brush 86 to the frame 16. The stripping tool may include visible indicia 15 adjacent at least one of the notches 34a, 34b, 36a, 36b for indicating the diameter of the cable jacket or buffer tube portion to be stripped.

Figure 10:
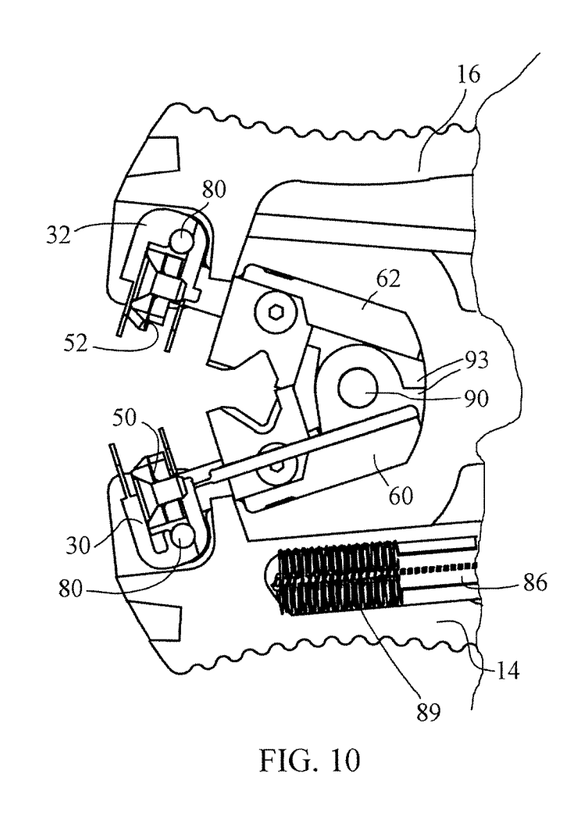
FIG. 10 is a left side cutaway view of a portion of the stripping tool along lines 10-10 of FIG. 9.
Figure 11:
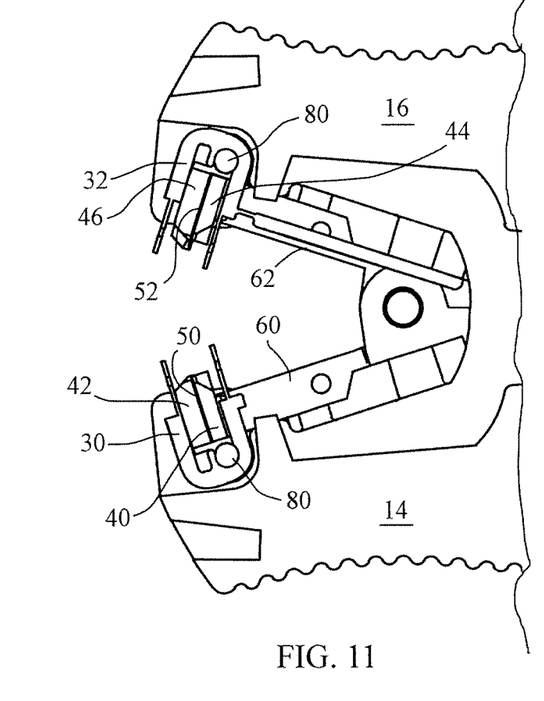
FIG. 11 is a left side cutaway view of a portion of the stripping tool along lines 11-11 of FIG. 9.
Figure 12:
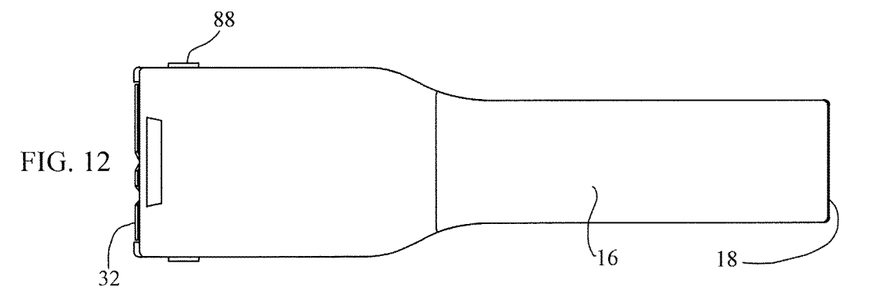
FIG. 12 is a top elevational view of the stripping tool shown in FIG. 2.
Figure 13:
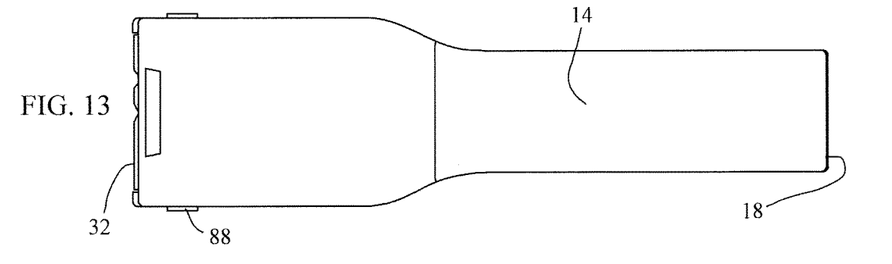
FIG. 13 is a bottom elevational view of the stripping tool shown in FIG. 2.
Figure 14:
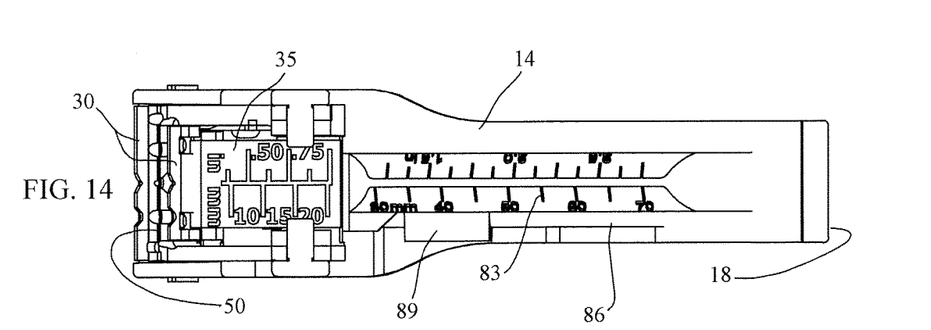
FIG. 14 is a top cutaway view of the stripping tool along lines 14-14 of FIG. 7.
Figure 15:
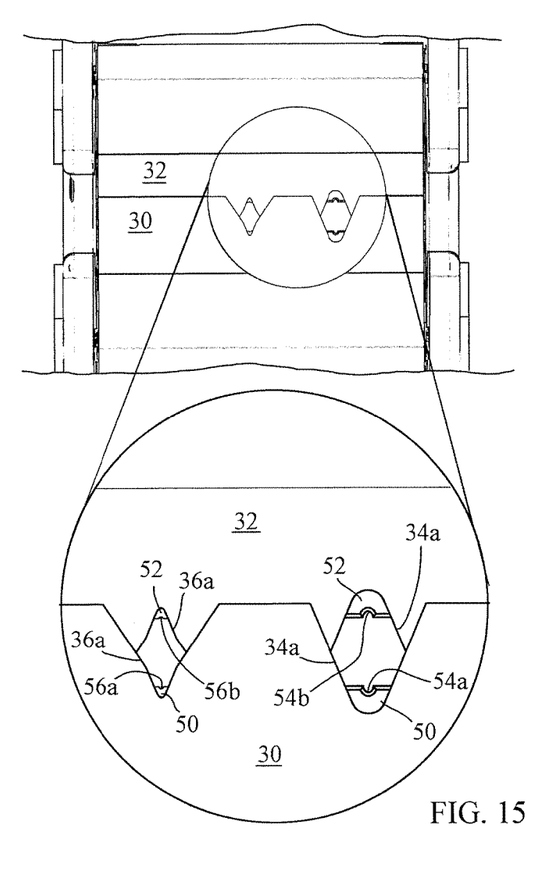
FIG. 15 is a front elevational view of the fiber optic stripping tool in a partially closed position.
Figure 16:
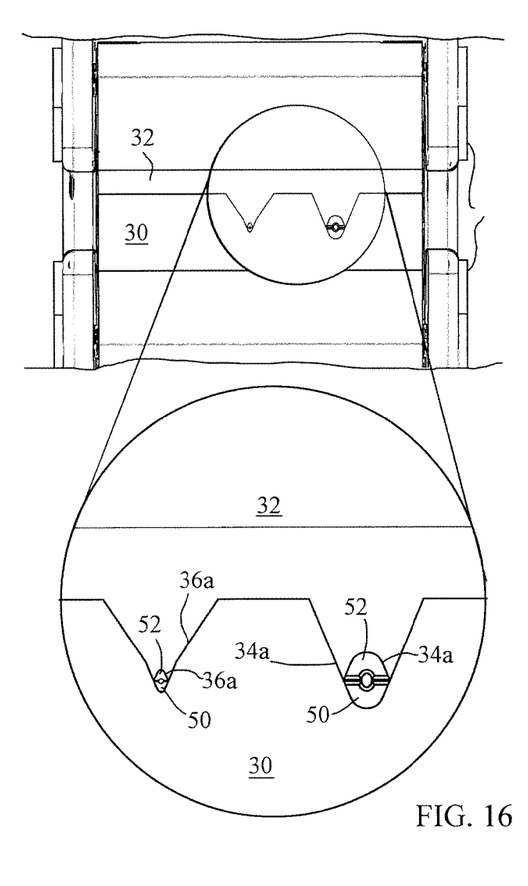
FIG. 16 is a front elevational view of the fiber optic stripping tool in a fully closed position.
Figure 17:
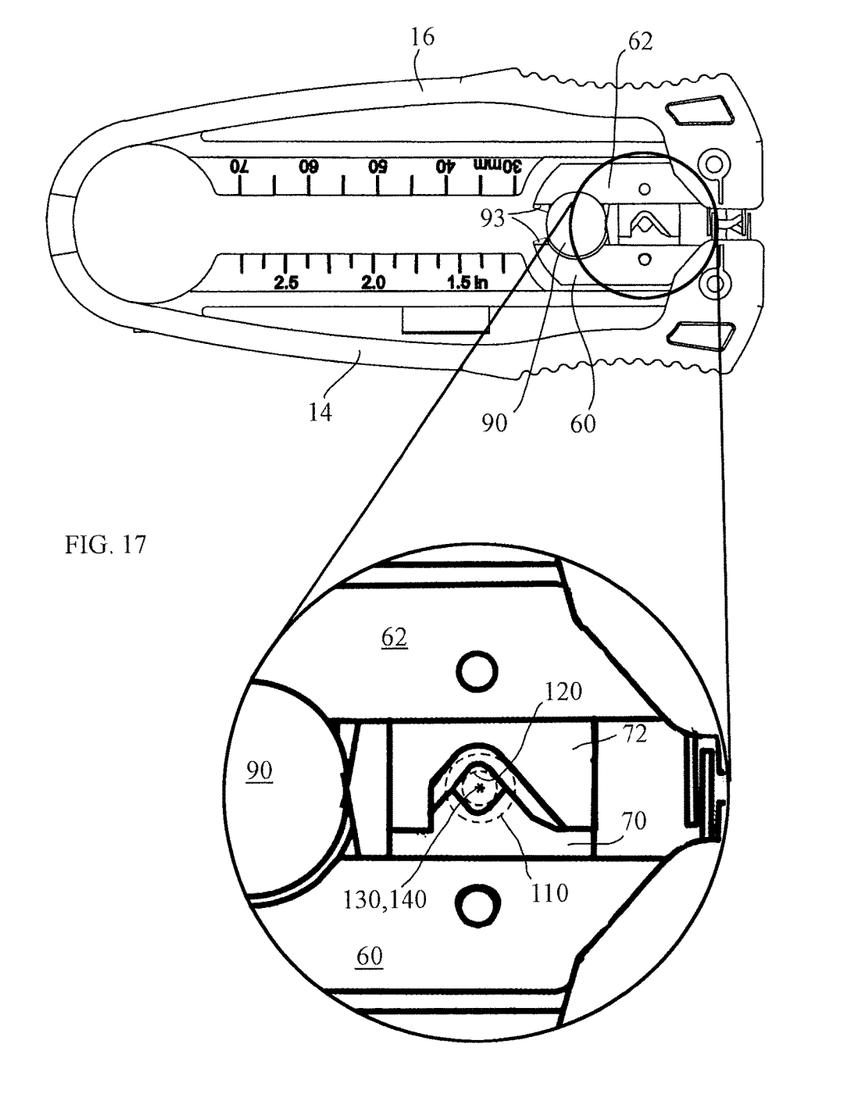
FIG. 17 is a side elevational view of the jacket blades and fiber optic cable secured between the blades.
Figure 18:
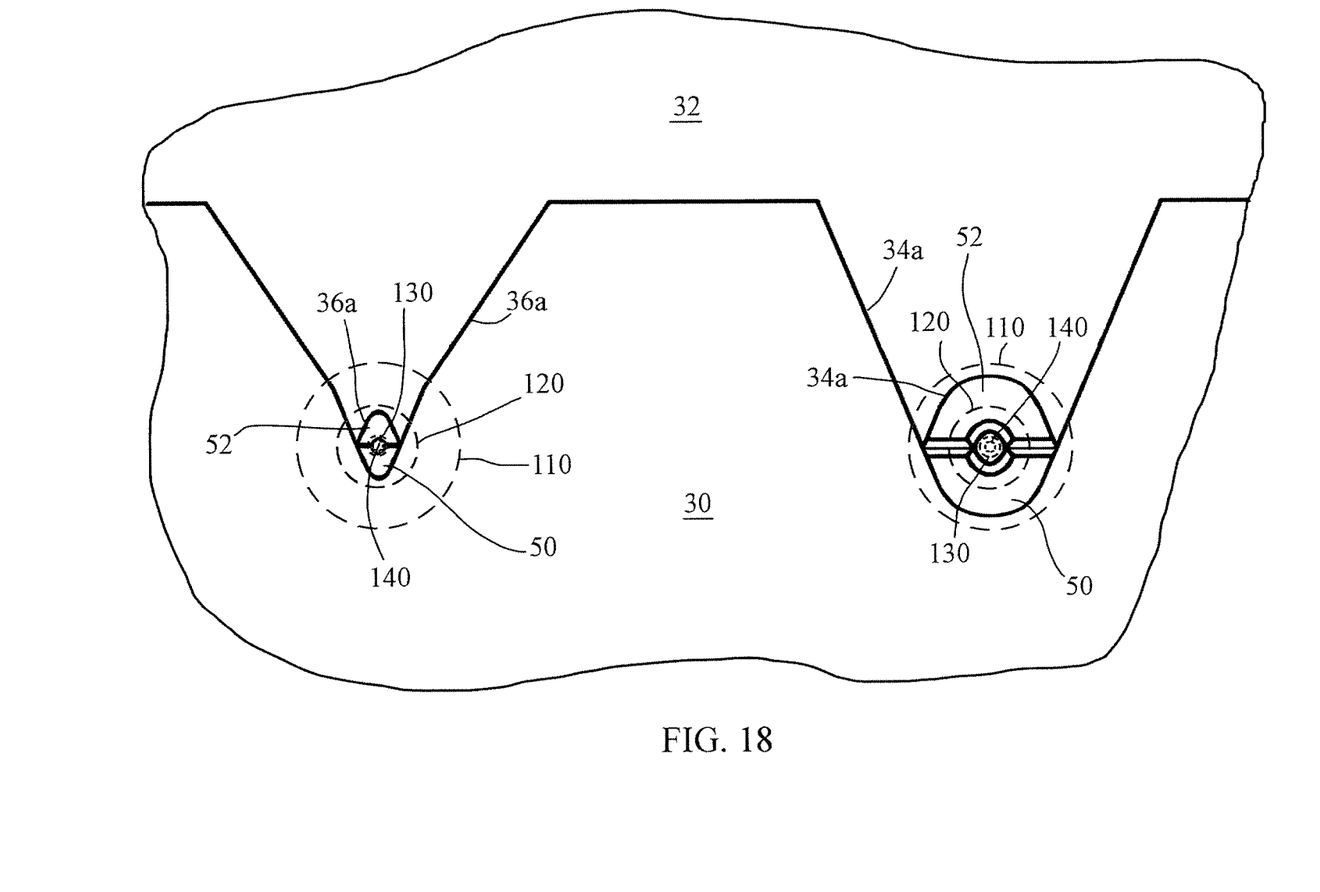
FIG. 18 is a front elevational view of a portion of the stripping tool and fiber optic cable secured between the opposing guide attachments.

The fiber optic stripping tool 10 may include a thumb or finger depression 20 with a serrated surface so that the finger or thumb will comfortably engage the outer arms 14, 16. The fulcrum 18 may provide a bias for the stripping tool 10 in the open position as shown in FIGS. 5-8, wherein arms 14, 16 are urged away from each other. FIGS. 10 and 11 show a cutaway portion of the stripping tool 10 as indicated by lines 10-10 and 11-11 in FIG. 9. FIGS. 12 and 13 show a top and bottom view of the stripping tool 10 and FIG. 14 shows a top cutaway view of the stripping tool 10 as indicated by line 14-14 in FIG. 7.

Figure 6:
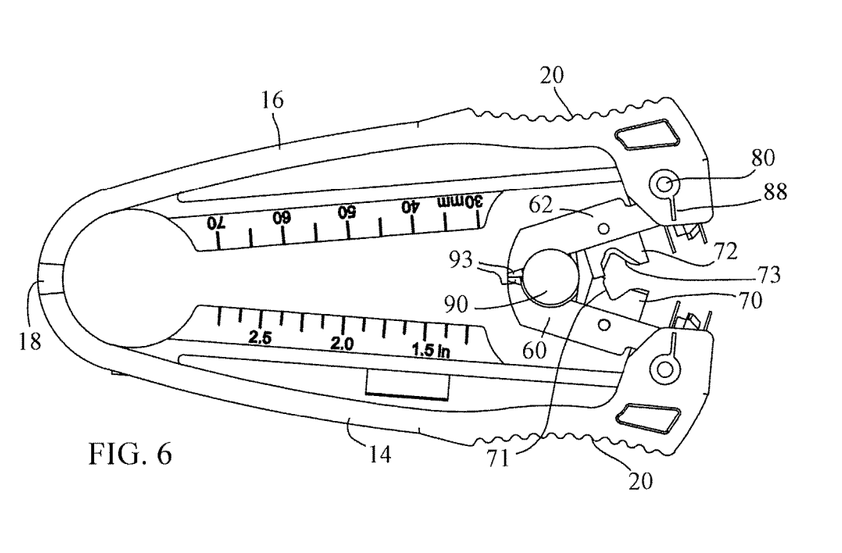
FIG. 6 is a left side elevational view of the stripping tool shown in FIG. 2.
Figure 7:
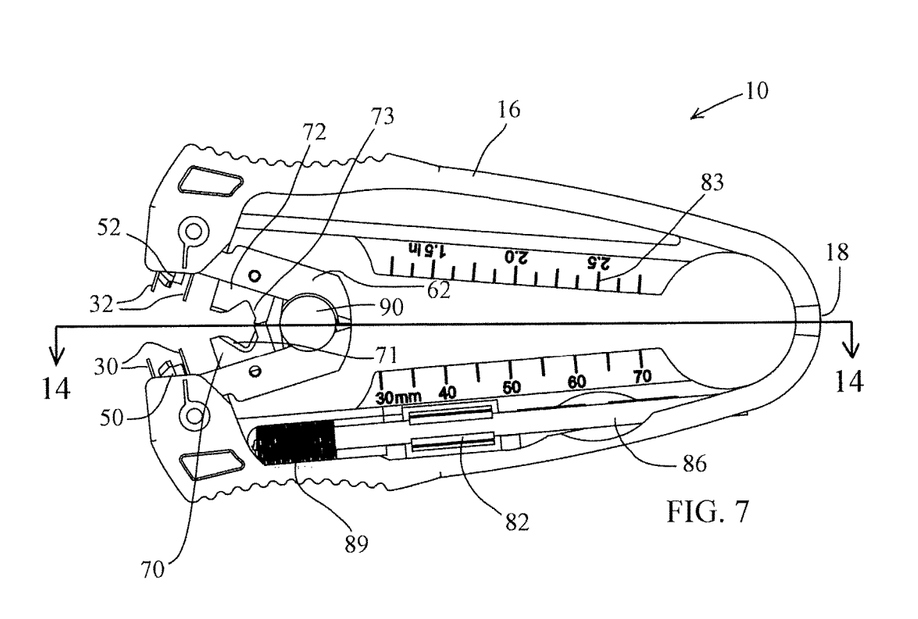
FIG. 7 is a right side elevational view of the stripping tool shown in FIG. 2.
Figure 8:
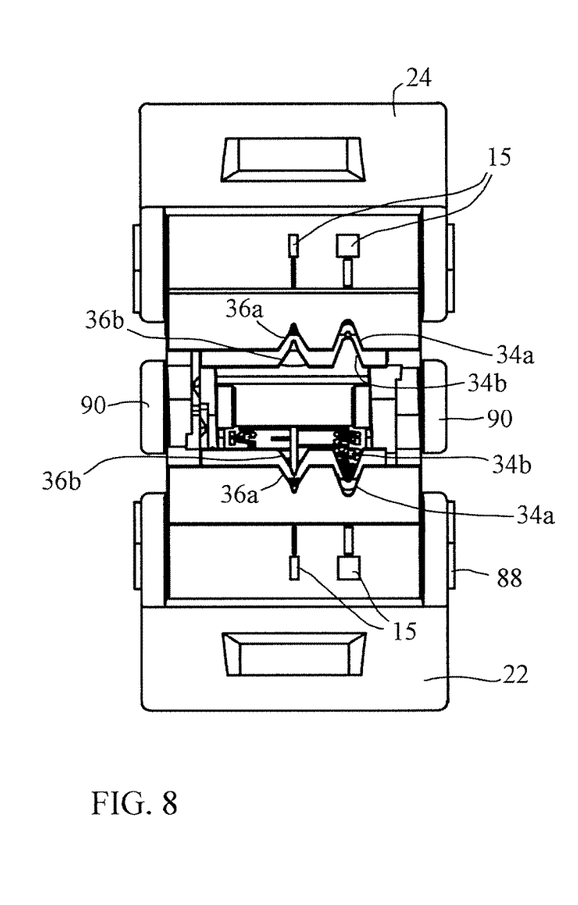
FIG. 8 is a front elevational view of the stripping tool shown in FIG. 2.
Figure 9:
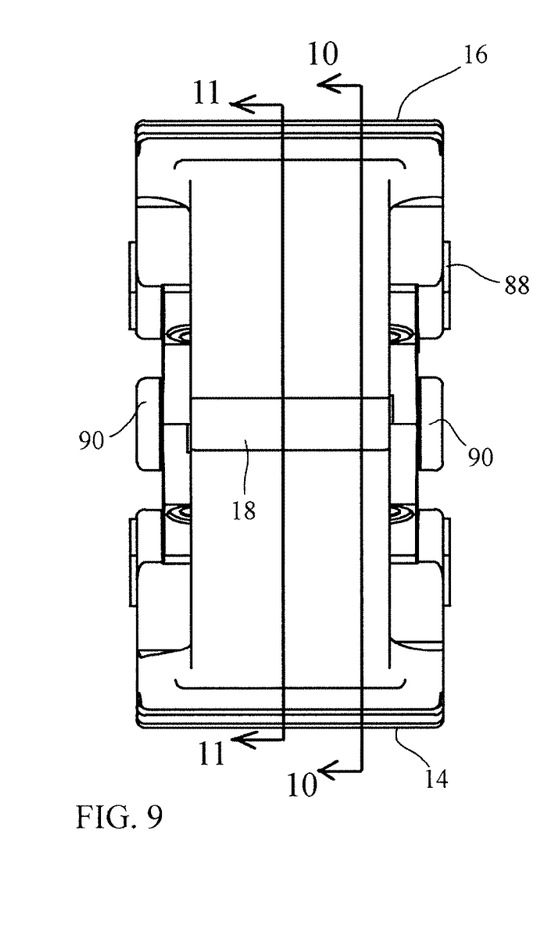
FIG. 9 is a rear elevational view of the stripping tool shown in FIG. 2.

A method for using the stripping tool 10 is described in FIGS. 6 and 16-18 showing portions of the stripping tool 10 which cuts and strips layers of the fiber optic cable 10. Referring first to FIG. 6 which is a side view of the stripping tool 10 in an fully open position, the jacket stripping blades 70, 72 and corresponding notches 71, 73 are in a position to allow an end portion of a fiber optic cable 10 to be placed between the notches 71, 73 by a user, so that the longitudinal axis of the cable is parallel to the two hinge axes 19 and 91. The stripping tool 10 is then moved to the closed position by the user by grasping the tool with one hand between the thumb and forefinger in serrated depressions 20 and pressing the outer arms 14, 16 toward one another, allowing the jacket stripping blades 70, 72 to cut through the fiber optic cable jacket 110 circumference without damaging the buffer tube layer 120 under the jacket 110. While continuing to hold the outer arms closed with one hand, the user then pulls the fiber optic cable 10 axially with the other hand, removing a portion of the outer jacket 110 from the end of the fiber optic cable 10 while leaving buffer tube layer 120 substantially intact. The user then releases the outer arms 14, 16, allowing the arms 14, 16 to return to their biased condition in the open position. With the longitudinal axis of cable 10 oriented transverse 90° to hinge axes 19, 91, the user then places the end of the fiber optic cable 10 between the notches 34a and 34b using the measurement plate 35 to place the fiber optic cable 10 in the correct axial position. The user presses the outer arms 14, 16 toward one another, allowing inner edge of the large semi-circular grooves 54a, 54b to cut through the outer buffer tube 120 without damaging inner buffer tube 130. The user then pulls cable 10 axially, transverse to axes 19, 91, and, removes the end portion of outer buffer tube 120 while underlying inner buffer tube 130 substantially intact. The user then releases the outer arms 14, 16, allowing the arms 14, 16 to return to their biased condition in the open position. The user then places the end of the fiber optic cable 10 which has a portion of the jacket 110 and outer buffer tube 120 removed between the notches 36a and 36b with the cable axis transverse to hinge axes 19, 91, using the measurement plate 35 to place the fiber optic cable 10 in the correct axial position. The user presses the outer arms 14, 16 toward one another, allowing the inner edge of the small semi-circular grooves 56a, 56b to cut through the inner buffer tube 130. The user then pulls the fiber optic cable 10 axially away from the stripping tool 10, removing the end portion of the inner buffer tube 130 and exposing a portion of the fiber optic cladding 140. The user then releases the outer arms 14, 16 to their biased position.

Thus, the present invention provides a tool which performs multiple functions in working with fiber optic cables, is capable of stripping multiple layers from a fiber optic cable, precisely secures a cable for ensuring sequential stripping of layers without damage to other layers below. The present invention provides a tool which strips the outer jacket from a fiber optic cable and removes the outer and inner buffer layers of the fiber optic cable.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A fiber optic stripping apparatus comprising:
   a frame having a fulcrum and a pair of outer arms extending from the fulcrum, each arm pivotal about the fulcrum;
   a pair of guide arms each attached at one end to a common pivot pin and at an opposite end to one end of the outer arm away from the fulcrum, a pair of second pivot pins secured in pivot openings disposed on the opposite end for pivotally securing each guide arm to the respective outer arm;
   a pair of first blades each first blade having a first blade edge, each of the first blades attached to a corresponding guide arm with the first blade edge extending in the direction of the corresponding frame arm;
   an upper and lower blade each having a second blade edge, each of the upper and lower blades attached to a corresponding guide arm with the upper and lower blade edges extending transverse to the direction of the corresponding outer arm, the upper and lower blades each having a first notch, the first notches forming a circle when the stripping apparatus is in a closed position;
   a first pair of guide attachments disposed on the first guide arm and disposed on opposite sides of and spaced away from the lower blade, each of the first guide attachments having a lower groove, the lower grooves aligned with the lower first notch; and
   a second pair of guide attachments disposed on the second guide arm and disposed on opposite sides of and spaced away from the upper blade, each of the second guide attachments having an upper groove, the upper grooves aligned with the upper first notch;
   whereby when a fiber optic cable is placed axially along the lower grooves and the stripping apparatus is moved to the closed position, an outer buffer tube on the fiber optic cable may be scored by the first notches.

2. The fiber optic stripping apparatus of claim 1 wherein the upper and lower blades each includes a second notch, the second notches forming a circle when the stripping apparatus is in a closed position and wherein each of the first and second lower guides includes a second lower groove, the second lower grooves aligned with the lower second notch and each of the first and second upper guides includes a second upper groove, the second upper grooves aligned with the upper second notch, whereby when a fiber optic cable is placed axially along the second lower grooves and the stripping apparatus is moved to the closed position, an inner buffer tube on the fiber optic cable may be scored by the second notches.

3. The fiber optic stripping apparatus of claim 1 including a stop disposed adjacent the common pivot pin of the guide arms for limiting the distance the guide arms extend away from one another.

4. The fiber optic stripping apparatus of claim 1 including a cleaning brush removably attached to one of the outer arms.

5. The fiber optic stripping apparatus of claim 1 wherein the guide arms terminate at the common pivot pin and are at an acute angle to one another when the stripping apparatus is in the open position and are substantially parallel when the stripping apparatus is in the closed position.

6. The fiber optic stripping apparatus of claim 1 wherein the first pair of guide attachments and second pair of guide attachments are positioned adjacent one another when the stripping apparatus is in the closed position whereby the upper and lower grooves are positioned to form various sized holes.

7. The fiber optic stripping apparatus of claim 1 including a measurement scale disposed on at least one of the arms for measuring the length of the cable to be stripped.

* * * * *